United States Patent [19]

Ho

[11] 4,443,682

[45] Apr. 17, 1984

[54] SUPERIMPOSED HIGH STRIKING VOLTAGE POWER SUPPLY CIRCUIT FOR ELECTRICAL DISCHARGE MACHINING

[75] Inventor: Kuang-Ta Ho, Pineville, N.C.

[73] Assignee: Colt Industries Operating Corp., New York, N.Y.

[21] Appl. No.: 315,197

[22] Filed: Oct. 26, 1981

[51] Int. Cl.³ .............................................. B23P 1/02
[52] U.S. Cl. ...................... 219/69 C; 219/69 P
[58] Field of Search ........................... 219/69 C, 69 P

[56] References Cited

U.S. PATENT DOCUMENTS

| | | | |
|---|---|---|---|
| 3,229,159 | 1/1966 | Webb | 315/171 |
| 3,365,612 | 1/1968 | Schierholt | 219/69 C |
| 3,390,246 | 6/1968 | Webb | 219/69 P |
| 3,668,361 | 6/1972 | O'Connor | 219/69 C |
| 3,809,848 | 5/1974 | Bell, Jr. | 219/69 C |
| 3,864,541 | 2/1975 | Inoue | 219/69 C |
| 3,988,560 | 10/1976 | Losey et al. | 219/69 P |
| 4,347,425 | 8/1982 | Obara | 219/69 P |

Primary Examiner—B. A. Reynolds
Assistant Examiner—Alfred S. Keve
Attorney, Agent, or Firm—Harry R. Dumont

[57] ABSTRACT

A circuit for electrical discharge machining including two MOSFETS. The first MOSFET (28) has its power conducting terminals connected between the gap (20,22) and DC power supply (30). Its gate is connected to a source of variable amplitude signals (14). The second MOSFET has its power conducting terminals connected between the gap (20,22) and a voltage DC power supply (40). It has its gate connected to a source of spike signals (18). A multivibrator (10) conjointly operates both sources (14 and 18).

12 Claims, 3 Drawing Figures

SUPERIMPOSED HIGH STRIKING VOLTAGE POWER SUPPLY CIRCUIT FOR ELECTRICAL DISCHARGE MACHINING

TECHNICAL FIELD

This invention relates to a power supply circuit for electrical discharge machining in which a high voltage, low current pulse is superimposed on a slope controlled cutting current pulse by the contolled operation of two MOSFETS.

BACKGROUND ART

There are a number of reasons for modifying the form of the EDM cutting pulse in such manner that the pulse would force the machining gap to ionize at the beginning of the machining power pulse and in a predictable fashion. It also is advantageous to turn on the machining power pulse or cutting current pulse in such a manner as to control the slope of the rising edge of the current pulse. This selectively variable control of the machining power pulse can operate to reduce the electrode wear, increase cutting speed and improve surface finish on the workpiece.

The prior art has recognized advantages in superimposed voltage cutting for EDM. U.S. Pat. No. 3,229,159 issued to Robert S. Webb on Jan. 11, 1966 shows one form of superimposed cutting voltage circuit. The disclosed power supply shows several arrangements of transformers with dual outputs from dual secondaries for providing the superimposed voltage operation. The power supply disclosed in that patent employs vacuum tubes for providing the switching operation.

A second and more recent U.S. Pat. No. 3,390,246 issued to Robert S. Webb on June 25, 1968 discloses an additional type of superimposed voltage circuit for EDM. The disclosure relates however to the use of a pair of electronic switches and a common triggering network again operating through a pulse transformer.

The present invention employs metal oxide, semiconductor field effect transistors, hereinafter sometimes referred to as MOSFETS, that have voltage and current ratings that permit the design of a power module and circuit that will provide a unique cutting pulse. A high voltage pulse of short duration, i.e. a voltage spike, is generated at the beginning of the main pulse thus reducing electrode wear. In addition, coupled with the high voltage spike, the current will be allowed to build up in a controlled manner and the slope of the current rise can be controlled to further reduce electrode wear. This technique of cutting further will increase cutting efficiency and surface finish since the current pulse will stimulate the spark to occur.

DISCLOSURE OF THE INVENTION

The present invention is adapted for use in a typical electric discharge machining apparatus. During the electrical machining process, a series of machining power pulses are passed across the machining gap between a conductive tool electrode and a workpiece over a broad range of frequencies in the presence of a dielectric fluid for cutting the workpiece.

In electrical discharge machining, the conductive tool is usually maintained in a proximate position with the workpiece by an automatic servo-feed and it is advanced into the workpiece as material is removed therefrom.

A fluid coolant, usually a liquid, is circulated through the working gap to flush the eroded particles from the gap. The coolant is sometimes furnished under pressure by a pump through a pattern of openings in the electrode. The defining characteristic of electrical discharge machining is that the coolant is a dielectric such as kerosene, transformer oil, or even pure water and is broken down in minute localized areas by the action of the machining power supply between the closest points of the tool electrode and the workpiece.

In present day EDM power supplies, bi-polar transistors are generally used as switches to provide the machining power pulses. Bi-polar transistors operate well as switches but do not function well in dynamic current situations. A highly useful new device know as the MOSFET is available on the market commercially from Siliconix Incorporated of Santa Clara, Calif. 95054 and from other commercial sources. These devices are capable of switching at very short on-times and are operable with very low drive characteristics. Another interesting characteristic of the device is that it is somewhat self current limiting. If the MOSFET fires into a gap short circuit, it is usually not damaged. A still further advantage of MOSFETS is that they are operable at higher voltage levels which makes possible the superimposed voltage operation and the circuit of the present invention. In the superimposed voltage operation of the present invention using two MOSFETS, the high voltage, low current spike is generated and placed on a low voltage, high current pulse. The rise time of the main machining power pulse is controllable by reason of the MOSFET switching characteristics. It is extremely difficult to achieve slope control of the current pulse with power bi-polar transistors. With the now available large current, high voltage, low "on" resistance power MOSFET, this slope control is made possible.

The use of the power MOSFET circuit according to the present invention, makes available a variety of wave shapes for the current pulse which shapes can be custom selected and used after test cutting for a great variety of workpiece and electrode material combinations.

Control of the operation of the MOSFET can be exercised by a variable frequency, variable on-time multivibrator or pulse generator. One such type of pulse generator is shown and described in Oliver A. Bell, Jr. U.S. Pat. No. 3,809,848 issued on May 7, 1974, for "DIGITALLY CONTROLLED POWER SUPPLY FOR ELECTRICAL DISCHARGE MACHINING APPARATUS". It is also possible to exercise control over the amplitude and shaping of the main machining current pulse through a programmed microprocessor or other general purpose computer. A network is also included to provide a voltage spike signal needed for the superimposed high voltage pulse.

The above and other advantages of the invention will become more readily apparent from the following detailed description when taken in conjunction with the accompanying drawings, in which:

BEST MODE OF CARRYING OUT THE INVENTION

Figure 2:
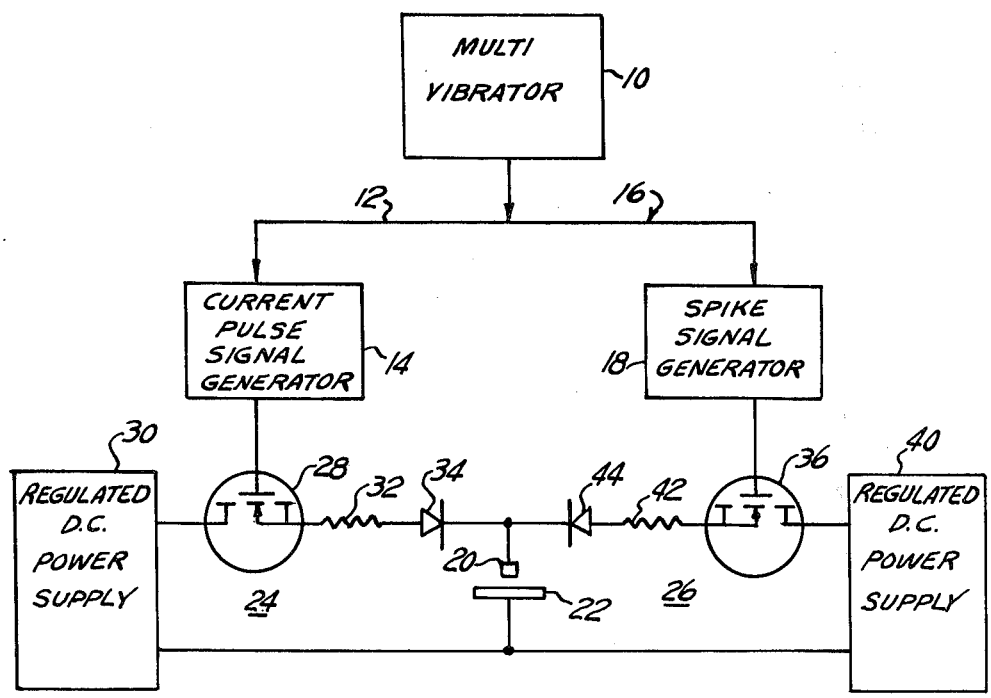
FIG. 2 is a combined schematic and diagrammatic showing of the superimposed voltage circuit.

Referring now to the circuit FIG. 2, control triggering pulses at the desired frequency and on/off times are initiated by a pulse generator 10. The triggering pulse output likewise, as has already been indicated, could be initiated and controlled by microprocessor control. Triggering pulses follow two paths, the first being through a lead 12 to a current pulse signal generator 14. The second path is through a lead 16 to a spike signal generator 18.

Two separate switching circuits are provided and connected to the EDM gap which includes a tool 20 and a workpiece 22. The main machining power pulse circuit is indicated by the numeral 24 while the spike voltage pulse circuit for initiating the firing is indicated by the numeral 26. The main machining power pulse circuit includes a MOSFET 28 having its gate connected to the output of the current pulse signal generator 14. The drain and source of the MOSFET 28 are connected between a regulated DC power supply 30 and the gap. A current limiting resistor 32 and diode 34 are also coupled in series with the gap.

The spike voltage portion of the output circuit 26 includes a second MOSFET 36 and a regulated DC power supply 40 of substantially greater voltage magnitude than the DC power supply 30. For example, the voltage of power supply 30 may be of the order of between 50 and 100 volts while that of DC power supply 40 may range between 250 and 400 volts. Also connected in series between the output of the MOSFET 36 and the gap is a similar current limiting resistor 42 and diode 44.

Figure 3:
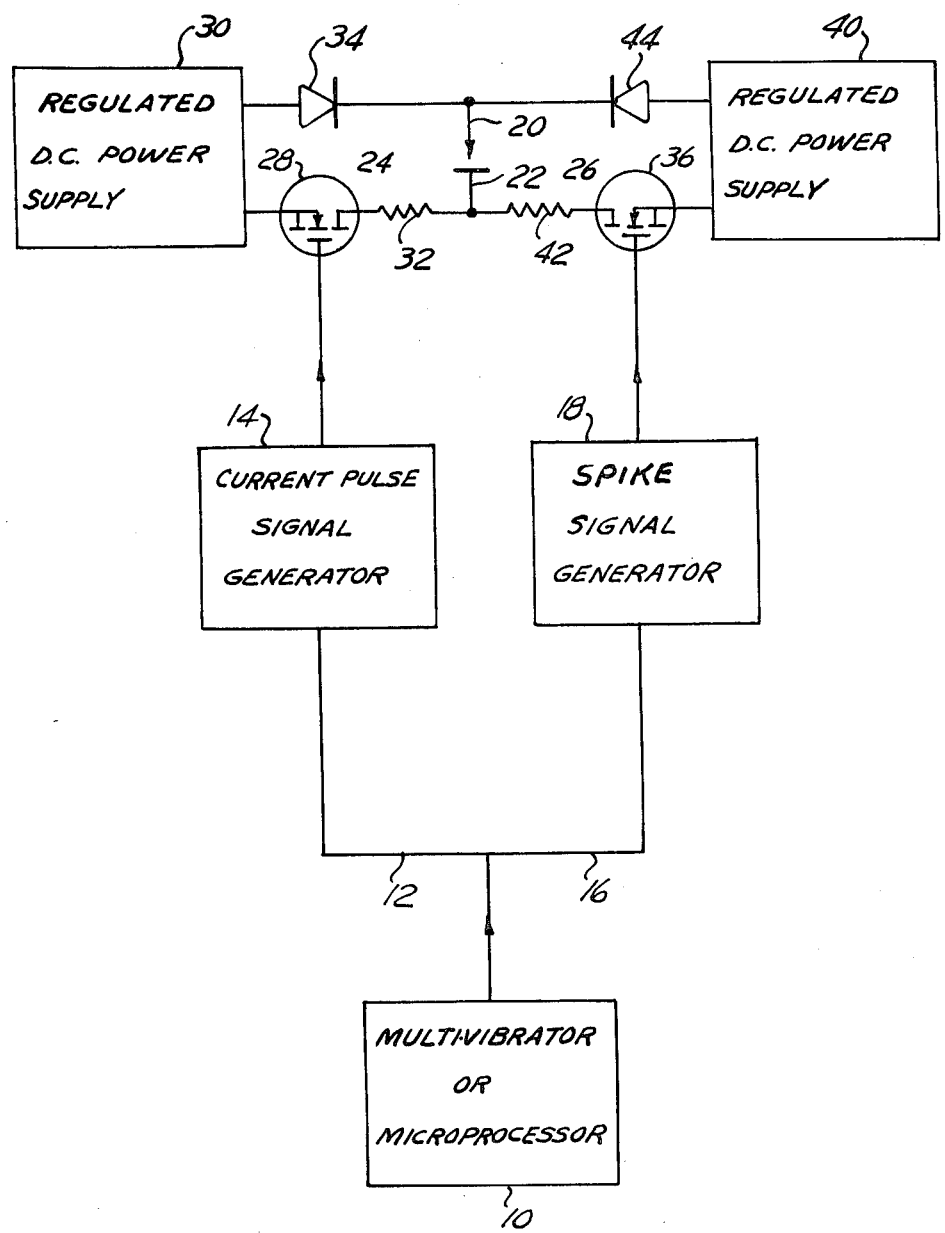
FIG. 3 is a showing of a different embodiment of the circuit of FIG. 2.

FIG. 3 shows a somewhat different form of my invention with respect to the manner in which resistors 32, 42 and diodes 34, 44 are connected in the circuit. Resistors 32 and 42 are serially connected in each case between the gap workpiece terminal 22 and the principal electrodes of MOSFETS 28 and 36. The diodes 34 and 44 are both connected with like polarity to the tool electrode 20 terminal.

Figure 1:
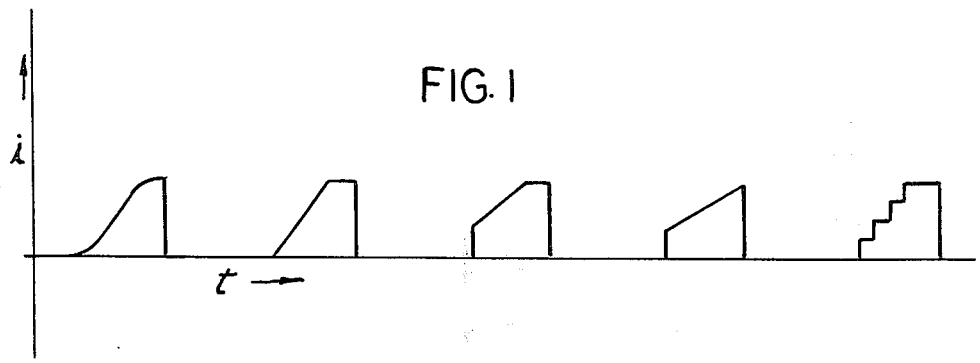
FIG. 1 is a current wave form diagram showing the wave shapes available for the combined current pulses.

Referring now to FIG. 1, this drawing shows a variety of shapes available for the main cutting current pulse. The fast-rise and fall times available from 28 and its close controllability by current pulse output from the signal generator 14 makes possible these different modes of operation. Thus it is possible to provide a great variety of machining power pulses, custom made and selective in accordance with the requirements of the particular machining operation.

It will thus be seen that I have provided by my invention a greatly improved EDM power supply circuit and particularly one for superimposed voltage operation.

I claim:

1. A circuit for providing electrical discharge machining current pulses across an electrical discharge machining gap, having two terminals comprising:
    a first MOSFET having its power conducting terminals connected betwen a gap terminal and a DC power supply terminal, said first MOSFET further having its gate connected to a source of variable amplitude pulse signals for selectively varying the slope of the rising edge of the machining current pulses;
    a second MOSFET having its power conducting terminals connected with like polarity to the first MOSFET between said gap terminal and a terminal of a second DC power supply of a greater voltage magnitude than the first-mentioned power supply;
    said second MOSFET having its gate connected to a source of spike signals; and
    means for conjointly operating both said sources.

2. The improvement of claim 1, wherein a common source of triggering pulses is connected to operate both said sources.

3. The improvement of claim 1, wherein a first blocking diode is connected between said gap terminal and one of said first MOSFET power conducting terminals and a second diode poled similarly relative to the gap is connected between such gap terminal and a like power conducting terminal of said second MOSFET.

4. The improvement of claim 3, wherein a current limiting resistor is connected in series with each of said diodes.

5. The improvement of claim 1, wherein said first DC supply is of the order of 50–100 volts and the magnitude of said second DC power supply is of the order of 250–400 volts.

6. The improvement of claim 1, wherein both said sources are operably connected to receive control input pulses from a microprocessor device.

7. The improvement of claim 1, wherein said last mentioned means comprises a multivibrator of the variable frequency, variable on-off time type.

8. The improvement of claim 1, wherein said first source comprises a current pulse signal generator.

9. The improvement of claim 1, wherein said second source comprises a spike signal generator.

10. The improvement of claim 1, wherein said first source comprises a current pulse signal generator and wherein said second source comprises a spike signal generator.

11. A circuit for providing electrical discharge machining current pulses across an electrical discharge machining gap having two terminals, comprising;
    a first MOSFET having its power conducting terminals connected in series with a first resistor between a gap terminal and a DC power supply terminal, said first MOSFET further having its gate connected to a source of variable amplitude pulse signals for selectively varying the slope of the rising edge of the machining current pulses;
    a second MOSFET having its power conducting terminals connected in series with a second resistor with like polarity to the first MOSFET between said gap terminal and a terminal of a second DC power supply of a greater voltage magnitude than first-mentioned power supply, said second MOSFET having its gate connected to a source of spike signals; and
    a source of triggering pulses for conjointly operating both said signal sources.

12. The improvement of claim 11, wherein a pair of blocking diodes are coupled in circuit, each connected with like poling between the other gap terminal and a respective other terminal of one of said power supplies.

* * * * *